United States Patent Office 3,779,971
Patented Dec. 18, 1973

3,779,971
LATEX-MODIFIED MORTAR COMPOSITIONS
Jerry E. Isenburg, Midland, Mich., assignor to The Dow Chemical Company, Midland, Mich.
No Drawing. Continuation-in-part of application Ser. No. 120,325, Mar. 2, 1971, which is a division of application Ser. No. 868,596, Oct. 22, 1969, which in turn is a continuation-in-part of application Ser. No. 610,497, Jan. 20, 1967, all now abandoned. This application July 24, 1972, Ser. No. 274,584
Int. Cl. C04b 13/24; C08f 45/24; E04g 21/20
U.S. Cl. 260—29.6 S         2 Claims

ABSTRACT OF THE DISCLOSURE

The invention is directed to high strength portland cement mortar compositions modified with certain vinylidene chloride polymer latexes and containing in addition, specified types of finely divided naturally occurring carbonate materials composed of a natural carbonate consisting of the minerals calcite, dolomite and magnesite which may comprise a continuous gradation from calcium carbonate through calcium magnesium carbonate to magnesium carbonate. It has unexpectedly been found that the addition of such carbonate materials greatly enhances the workability of the latex-modified portland cement mortar compositions without adversely affecting the strength characteristics of such compositions.

---

This application is a continuation-in-part of pending application Ser. No. 120,325, filed Mar. 2, 1971 (now abandoned), which is in turn a divisional application of application Ser. No. 868,596, filed Oct. 22, 1969 (now abandoned) which was in turn a continution-in-part of application Ser. No. 610,497, filed Jan. 20, 1967 (now abandoned).

BACKGROUND OF THE INVENTION

By way of background, portland cement is one of the most widely used materials in the construction industry. Although unmodified cement systems (i.e., those not containing a polymer latex modifier) have adequate properties for a vast number of construction applications, there remain many specialty areas in which such properties are not acceptable.

Latex-modified portland cement systems have been developed in the last ten to fifteen years that radically change the physical properties of the unmodified cement systems.

Of such latex-modified systems the addition of vinylidene chloride polymer latexes to portland cement mortar have provided exceptionally high strength thereby permitting, for the first time, the construction of load bearing external brick walls composed of a single course of bricks joined by the specified later-modified cement mortar. Further, and most importantly, such material maintains this high strength when the cure compositions are subjected to a wet environment.

The British Pat. 967,587 is directed to such vinylidene chloride polymer latex-modified portland cement mortars and serves to illustrate the unique characteristics of such mortarts as contrasted with other latex-modified cement mortar compositions such as the polyvinyl acetate latex-modified mortars.

SUMMARY OF THE INVENTION

With the development of such vinylidene chloride polymer latex-modified portland cement compositions it became evident that in addition to strength, the workability, i.e., the ability of the mason to effectivey apply such compositions was extremely critical. It was then discovered, which discovery forms the present invention, that the addition to the latex-modified portland cement compositions of specified types of certain additive materials provided the properties of high yield and low viscosity under shear which made such mortars highly useful in brick or block wall construction where ease of handling and high strength is required, without loss in strength of the cured cement-mortar compositions.

In arriving at such discovery, many of the commonly known additives for portland cement mortars were evaluated as potential workability agents. Surprisingly, it was found that only those materials composed of a natural carbonate consisting of the minerals calcite, dolomite and magnesite which comprise a continuous gradation from calcium carbonate through calcium magnesium carbonate to magnesium carbonate, and having an average particle size capable of passing through a 200 mesh screen, were effective as workability agents in the specified vinylidene chloride polymer latex-modified portland cement compositions without adverse effect on the strength properties of the cured cement-mortar compositions.

DESCRIPTION OF THE PREFERRED EMBODIMENTS

Specifically, the present invention contemplates latex-modified mortar compositions which comprise, on a volume basis calculated as the volume displaced when the ingredient is immersed in water:
 (a) About 100 volumes of portland cement
 (b) Between aout 200 and 10,000 volumes of a mineral aggregate,
 (c) Between about 80 and 170 volumes of water,
 (d) Between about 8 and 170 volumes of polymer solids of an aqueous dispersion of an organic interpolymer latex composed of from about 35 to about 90 percent by weight of vinylidene chloride and from about 65 to about 10 percent by weight of at least one other interpolymerized material of the general formula:

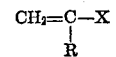

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to 18 carbon atoms inclusively, and
 (e) Between about 25 and 160 volumes of a workability agent composed of a natural carbonate consisting of the minerals calcite, dolomite and magnesite which may comprise a continuous gradation from calcium carbonate through calcium magnesium carbonate to magnesium carbonate wherein the workability agent has an average particle size capable of passing a 200 mesh screen (U.S. Standard Sieve Series), i.e., wherein at least 50 percent of the particulate workability agent passes through a 200 mesh screen.

The cement referred to may be selected from the group of inorganic settable materials, such as hydraulic, portland, natural, or aluminous cement.

The mineral aggregate used may be stone, gravel, pebbles, granite, Carborundum, aluminum oxide, emery, marble chips, sawdust, cinders or other aggregate commonly employed in cement mortars. The intended end use of the mortar can undoubtedly serve as a guide to those skilled in the art as to the choice of preferred particle size of the aggregate material to be included in the improved latex-modified mortars of the present invention.

By the term "latex" as used herein is meant any aqueous colloidal dispersion of the interpolymeric thermoplastic, resinous substances described herein.

Exemplary of such interpolymerizable monomeric materials are: methyl acrylate, ethyl acrylate, propyl acrylate, isopropyl acrylate, butyl acrylate, isobutyl acrylate, sec.-butyl acrylate, tert.-butyl acrylate, amyl acrylate, iso-amyl acrylate, tert.-amyl acrylate, hexyl acrylate, 2-ethylhexyl acrylate, cyclohexyl acrylate, octyl acrylate, 3,5,5 - trimethylhexyl acrylate, decyl acrylate, dodecyl acrylate, octadecenyl acrylate, methyl methacrylate, ethyl methacrylate, 2 - ethylbutyl methacrylate, octyl methacrylate, phenyl methacrylate, cyclohexyl methacrylate, 3,5,5 - trimethylhexyl methacrylate, decyl methacrylate, dodecyl methacrylate, and octadecyl methacrylate and butoxyethyl acrylate or methacrylate or other alkoxyethyl acrylates or methacrylates, vinyl halides (e.g., vinyl chloride, vinyl bromide, etc.), acrylonitrile, methacrylonitrile, and the like.

Representative types of water-insoluble vinylidene chloride-containing interpolymer latexes which have been discovered to be highly satisfactory as the latex components employed in the superior latex-modified portland cement mortar compositions of the present invention include the following interpolymer latexes designated in the following Table I.

TABLE I
Vinylidene Chloride-Containing Interpolymer Latex Compositions

| Organic monomer components | Percent by weight | | | | | | | | | | |
|---|---|---|---|---|---|---|---|---|---|---|---|
| Vinylidene chloride | 40 | 60 | 89 | 90 | 50 | 88 | 50 | 52 | 70 | 75 | 75 | 75 |
| Vinyl chloride | | | | | | | 40 | 35 | 20 | 20 | 20 | 20 |
| Ethyl acrylate | 60 | 40 | | | 40 | 7 | 10 | | 10 | 5 | | 3 |
| Methyl methacrylate | | | 10 | 10 | | | | | | | | 2 |
| 2-ethylhexyl acrylate | | | | | | | | 13 | | | | |
| Acrylonitrile | | | 11 | | 5 | | | | | | 5 | |

Of particular benefit in the preparation of the exceptionally strong, latex-modified portland cement compositions of the present invention is the interpolymer latex, shown above, containing about 75 percent by weight of interpolymerized vinylidene chloride, about 20 percent by weight of interpolymerized vinyl chloride, about 3.0 percent by weight of interpolymerized ethyl acrylate, and about 2.0 percent by weight of interpolymerized methyl methacrylate.

For mortars embodying the present concept, the amount of water in the composition should not exceed about 170 volumes per 100 volumes of the composition and preferably between about 80 and 170 volumes (including the water derived from the latex) to provide the conventional paste-like consistency associated with mortars.

As mentioned previously, the workability, i.e., the characteristic of high yield values with low viscosity under shear, of such latex-modified mortar compositions is desirably enhanced by the addition of between about 25 and 160 volumes of a natural carbonate consisting of the minerals calcite, dolomite, and magnesite which may comprise a continuous composition gradation from calcium carbonate through calcium magnesium carbonate to magnesium carbonate (Dana's System of Minerology, 7th ed., vol. II, 1951, Wiley-Calate, p. 142; Magnesite, p. 162; Dolomite, p. 207) wherein such materials have an average particle size of less than about 200 microns. Use of workability agents of the type described herein but of larger average particle sizes provides undesirable non-uniformity of results.

By way of further explanation concerning the normal mode of mortar preparation and application, after the concrete, mortar, or portland cement mortar and aqueous dispersion of an organic, thermoplastic, interpolymer latex, and carbonate material as described heretofore, have been thoroughly comingled and mixed with the preferred amount of water to the desired smoothness of texture, the same may be subsequently poured into forms, or spread over a surface area and immediately thereafter troweled or smoothed to form a plane face. Finally, the mass of latex-modified mortar is allowed to set and harden as chemical hydration occurs and the residual water evaporates.

The following specific examples further illustrate the present invention wherein the proportions of the composition ingredients are specified in parts by volume of the defined composition.

EXAMPLE 1

The following general formulation was used to prepare a series of individual latex-modified cement mortar compositions.

Formulation

| Material: | Volumes |
|---|---|
| Portland cement | 100 |
| Water (including $H_2O$ derived from latex) | 144–160 |
| Sand | 342–359 |
| Interpolymer latex (50% solids), 75 wt. percent vinylidene chloride, 20 wt. percent vinyl chloride, 3 wt. percent ethyl acrylate, 2 wt. percent methyl methacrylate, .4 wt. percent silicone antifoamer, 6 wt. percent nonionic surfactant | [1] 33.4 |
| Workability agent | 14–61.6 |

[1] Based on interpolymer solids.

In each instance, the sand and portland cement were first thoroughly mixed and water, aqueous interpolymer latex dispersion and workability agent were then combined and added thereto. The entire formulation was then mixed in a conventional paddle-type mortar mixer until an even consistency resulted (about 4 to 5 minutes).

The effectiveness of each formulation as a masonry mortar was determined by the utilization of the individual compositions as mortar in the construction of a brick wall. In such evaluation, each composition was separately applied and evaluated by a qualified mason for workability. A typical mason's rating is reproduced below which includes a numbered list of specific requirements for mortar effectiveness. Workability improvement is represented by increasingly higher point totals.

All rating mortars to be made in direct comparison to standard brick mortar.

Mason's Rating Card.—Total Points

| 1 | Stickiness | 10 | 20 | 30 | 20 | 10 |
|---|---|---|---|---|---|---|
| 2 | Shear | 10 | 30 | 50 | 30 | 10 |
| 3 | Rate of set | (vicat drop in 30 min.) | | | | Subtract |
| 4 | Tooling | 2 | 6 | 10 | 6 | 2 |
| 5 | Lateral flow | 30 | 24 | 18 | 12 | 6 |
| 6 | Comments | (add or subtract 0–10 pts.) | | | | |

As indicated, the workability of a mortar composition is inclusive of more than one property, i.e., the mason must be able to pick up a reasonable amount of mortar on his trowel, and with a flick of the wrist, string it out on the brick base. Thus, the mortar must slip off the trowel cleanly and lie in a smooth pile on the brick layer where it is thereafter smoothed over the brick layer. After the mortar has been evenly spread over the brick surface, the excess mortar at the edges of such surface is used to perfect and continue the mortar layer. This layer is called the "bed-joint." Thus, the mortar must not crumble or tear when smoothed and should "hang up" to a thickness of about ½ inch over the edge, in an area having an excess of mortar, without falling with subsequent loss thereof. In addition, the the mortar must stand on the joint and not funnel down into the cores of the bricks unless forced there by use of a trowel. The mason then begins a new layer (course) of brick. For example, he may start in the middle of the base course and lay brick to one end. In doing so, he first places a new brick in proper position on the bed mortar layer and presses until the top front of the brick matches a previously applied chalk line. He then scrapes the mortar squeezed out from either side or both sides of the bed joint and places this excess of the free end of the brick facing the same direction he is moving along the wall. This is done by one or two strokes with the trowel top flat to one edge of the brick end. The next brick is settled into place by a combination of backward and downard pressure to squeeze both joints and position the new brick in all three directions. Thus, the mortar must not fall when squeezed out of the bed joint, the brick must require only moderate pressure and no tapping to settle it to the proper top height, the mortar must stay in place on the end of the brick while the mason places the next brick, and the mortar must cover the entire end when squeezed by the next brick. This process is continued to the end of the course of brick, extending the bed joint whenever necessary. At the end, the last brick is "buttered" with mortar on one end and gently lowered into place. The mortar must stick to the end when pressed ("buttered") there so that the brick can be lowered into place with the mortar on a vertical end. The course is checked for front to back levelness and the next brick course is applied. There must be no movement of the brick under their own and the above course's weight. The mason's reserve mortar must remain fluid until used. Later the wall is "tooled." The joints are gouged with a shaped rod to indent them to some desired shape. The mortar must not crumble, crack or pull away from the joint during tooling, yet it must indent readily.

By way of summation, the mortar must flow easily when the mason puts pressure on it; the mortar must not flow under its own weight even when standing vertically or under the weight of a few bricks; the mortar must stiffen somewhat after placement to resist the weight of subsequent brick courses; and the mortar should stay partly fluid in the joints and completely fluid in the reserve pile or supply. All of these requirements are reflected in the rating given by the mason on his mason's rating card above. In general, a rating of at least about 110 is required for a usable mortar composition with a rating of 115 to 120 or more being preferred.

The following Table II specifically illustrates the composition evaluated and their workability and strength properties.

TABLE II

| Sample No. | Cement | Water | Sand | Latex solid | Workability additives Type | Amt. (vol.) | Mason rating |
|---|---|---|---|---|---|---|---|
| For comparison: | | | | | | | |
| 1 | 100 | 144 | 359 | 33.4 | None | None | 101 |
| This invention: | | | | | | | |
| 2 | 100 | 151 | 359 | 33.4 | (¹) | 34.8 | 114 |
| 3 | 100 | 151 | 359 | 33.4 | (¹) | 46.4 | 118 |
| 4 | 100 | 151 | 359 | 33.4 | (¹) | 58 | 121 |
| 5 | 100 | 142 | 350 | 33.4 | (¹) | 61.6 | 122 |
| 6 | 100 | 160 | 342 | 33.4 | (²) | 56.8 | 122 |

¹ Marble floor (from Piqua, Ohio) (95% through a 200 mesh screen).
² Ute dolomite limestone (75% through a 200 mesh screen).

The data set forth in Table II illustrate the significant and unexpected improvement in workability (as given by comparative mason ratings) obtained by utilization of the compositions contemplated by this invention.

EXAMPLE 2

In each of a series of additional experiments, the following general formulation was used to prepare a series of individual latex-modified cement mortar compositions.

Formulation

| Material: | Volumes |
|---|---|
| Portland cement | 100 |
| Water (including H₂O derived from latex) | 137–189 |
| Sand | 357–359 |
| Interpolymer latex (50% solids), 75 wt. percent vinylidene chloride, 20 wt. percent vinyl chloride, 3 wt. percent ethyl acrylate, 2 wt. percent methylmethacrylate, .4 wt. percent silicone antifoamer, 6 wt. percent nonionic surfactant | ¹ 33.4–38.2 |
| Workability additive | 0–3.94 |

¹ Based on interpolymer solids.

In each instance, the sand and portland cement were first thoroughly mixed and water, aqueous interpolymer latex dispersion and workability additive were then combined and added thereto. The entire formulation was then mixed in a conventional paddle-type mortar mixer until an even consistency resulted (about 4 to 5 minutes).

The effectiveness of each formulation as a masonry mortar was determined by the utilization of the individual compositions as mortar in the construction of a brick wall. In such evaluation, each composition was separately applied and evaluated by a qualified mason for workability using the rating system set forth in Example 1.

The following Table III specifically illustrates the compositions evaluated and their workability properties where all amounts are given in volume:

TABLE III

| Sample No. | Cement | Water | Sand | Latex solid | Workability additive Type | Amt. | Mason rating |
|---|---|---|---|---|---|---|---|
| 7 | 100 | 144 | 359 | 33.4 | None | | 101 |
| 8 | 100 | 189 | 359 | 33.4 | (¹) | 1.4 | <100 |
| 9 | 100 | 137 | 357 | 38.2 | (²) | 3.94 | 35 |
| 10 | 100 | 154 | 357 | 38.2 | (³) | 2.52 | 36 |

¹ Methylcellulose having a viscosity of 4000 (Methocel HG65).
² Asbestos (Johns Manville shorts).
³ Calcium chloride.

The above data illustrate that the conventional cement-mortar additives calcium chloride, asbestos and a methylcelulose adversely affect the workability of the herein described vinylidene chloride polymer latex-modified cement mortar compositions.

EXAMPLE 3

In each of a series of additional experiments, the following general formulation was used to prepare a series of individual latex-modified cement mortar compositions.

Formulation

| Material: | Volume |
|---|---|
| Portland cement | 100 |
| Water (including H₂O derived from latex) | 144 |
| Sand | 359 |
| Interpolymer latex (50% solids), 75 wt. percent vinylidene chloride, 20 wt. percent vinyl chloride, 3 wt. percent ethyl acrylate, 2 wt. percent methylmethacrylate, .4 wt. percent silicone antifoamer, 6 wt. percent nonionic surfactant | 33.4 |
| Workability agent | (¹) |

¹ Amount giving optimum properties as individually determined for each workability agent.

In each instance, the sand and portland cement were first thoroughly mixed and water, aqueous interpolymer latex dispersion and workability additives were combined and added thereto. In each instance, the entire formulation was then mixed in a conventional paddle-type mixer until an even consistency resulted.

The workability of each formulation as a masonry mortar was determined using the method of Isenburg, Materials Research and Standards, July 1965, pp. 358–361.

The following Table IV illustrates the workability additives evaluated and their effect on workability and strength.

TABLE IV

| Sample No. | Workability additive | Volumes/ 100 volumes of cement | Workability rating (0/45 ratio) | Crossed brick strength gross load/lbs. (ASTM C-321) |
|---|---|---|---|---|
| 11 | None | | 0.260 | 2,500–3,100 |
| 12 | Methyl cellulose | 0.63 | 0.220 | |
| 13 | $K_2SiO_3$ | 5–6 | 0.680 | 1,400–1,870 |
| 14 | Lime | 20.2 | 0.970 | 2,200–2,700 |
| 15 | Clay | 14.6 | 0.680 | 1,300–1,550 |
| 16 | Limestone | 61.8 | 0.850 | 3,050–3,630 |

From the data set forth in Table IV, the two best additives were selected for further testing using the same compositions as set forth herein. To more nearly simulate masonry design needs, small assemblages were tested in flexure. The addition of lime was unexpectedly found to result in a significant loss of strength as compared to samples containing limestone as a workability additive.

TABLE V

| Sample number | Workability additive (volumes/100 volumes of cement) | | Flexural strength, p.s.i. |
|---|---|---|---|
| | Limestone | Lime | |
| 17 | 61.8 | 0 | 431, 320, 340, 390. |
| 18 | 0 | 20.2 | 176, 205. |
| 19 | 0 | 0 | Ca. 340 to 400. |

The above data indicate that limestone provides the necessary workability without detriment to latex strength whereas lime provides workability but seriously reduces strength.

What is claimed is:

1. A mortar composition consisting essentially, on a volume basis calculated as the volume displaced when the ingredient is immersed in water, of
   (a) about 100 volumes of portland cement,
   (b) between about 200 and 10,000 volumes of a mineral aggregate,
   (c) between about 80 and 170 volumes of water,
   (d) between about 8 and 170 volumes of polymer solids of an aqueous dispersion of an organic interpolymer latex composed of from about 35 to about 90 percent by weight of vinylidene chloride and from about 65 to about 10 percent by weight of at least one other interpolymerized material of the general formula:

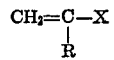

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to 18 carbon atoms inclusively, and
   (e) between about 25 and 160 volumes of a workability agent composed of a natural carbonate consisting of the minerals calcite, dolomite and magnesite and mixtures thereof said workability agent having an average particle size capable of passing through a 200 mesh screen.

2. The composition of claim 1 wherein the interpolymer latex solids are composed of about 75 percent by weight of vinylidene chloride, about 3 percent by weight of ethyl acrylate, about 2 percent by weight of methyl methacrylate and about 20 percent by weight of vinyl chloride.

References Cited

UNITED STATES PATENTS 2,990,382   6/1961   Wagner et al. _____ 260—29.6 S
2,819,239   1/1958   Eberhard et al. ___ 260—29.6 S

FOREIGN PATENTS 654,293   12/1962   Canada _____ 260—29.6 S
886,141   11/1962   Great Britain _____ 260—29.6 S
967,687   8/1964   Great Britain ____ 260—29.6 S HAROLD D. ANDERSON, Primary Examiner U.S. Cl. X.R.

52—747; 260—29.6 T